(12) United States Patent
Friel et al.

(10) Patent No.: US 11,265,302 B2
(45) Date of Patent: *Mar. 1, 2022

(54) SECURE BOOTSTRAPPING OF CLIENT DEVICE WITH TRUSTED SERVER PROVIDED BY UNTRUSTED CLOUD SERVICE

(71) Applicant: Cisco Technology, Inc., San Jose, CA (US)

(72) Inventors: Owen Brendan Friel, Galway (IE); Jason Cresswell, Buckinghamshire (GB); Pandit Panburana, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/451,235

(22) Filed: Jun. 25, 2019

(65) Prior Publication Data

US 2019/0312856 A1  Oct. 10, 2019

Related U.S. Application Data

(63) Continuation of application No. 15/389,534, filed on Dec. 23, 2016, now Pat. No. 10,382,413.

(51) Int. Cl.
*H04L 29/06* (2006.01)
*G06F 9/4401* (2018.01)

(52) U.S. Cl.
CPC .......... *H04L 63/067* (2013.01); *G06F 9/4401* (2013.01); *H04L 63/0428* (2013.01); *H04L 63/0838* (2013.01)

(58) Field of Classification Search
CPC ...... G06F 9/4401; G06F 9/0841; G06F 21/44; H04L 63/067; H04L 63/0838;
(Continued)

(56) References Cited

U.S. PATENT DOCUMENTS 6,061,791 A    5/2000  Moreau
9,038,157 B1 * 5/2015  Santiago, Jr. ......... H04W 12/06
                                                  726/9
(Continued)

OTHER PUBLICATIONS

"Using OAuth 2.0 to Access Google APIs", Google Identity Platform, https://developers.google.com/identity/protocols/OAuth2?csw=1#device, retrieved from the internet on Dec. 22, 2016, 10 pages.
(Continued)

*Primary Examiner* — Lynn D Feild
*Assistant Examiner* — Abdullah Almamun
(74) *Attorney, Agent, or Firm* — Edell, Shapiro & Finnan, LLC

(57) ABSTRACT

A trusted server receives a request for an activation code, which includes an identifier associated with the trusted server and a one-time password, for a client device. The trusted server obtains the identifier from a public server, generates the one-time password, and combines the one-time password with the identifier to create the activation code. The trusted server provides the activation code to a provisioning client, which presents the activation code to the client device. The trusted server and client device secure a communication session using the one-time password as a shared secret. The trusted server downloads trusted cryptographic information to the client device over the secure communication session.

20 Claims, 11 Drawing Sheets

(58) Field of Classification Search
CPC . H04L 63/062; H04L 63/061; H04L 63/0428; H04L 9/3273; H04L 9/006; H04L 9/3228; H04L 9/0894
See application file for complete search history.

(56) References Cited

U.S. PATENT DOCUMENTS

| | | | |
|---|---|---|---|
| 9,432,339 B1 | 8/2016 | Bowness | |
| 9,467,811 B2 | 10/2016 | Nilsson | |
| 9,967,750 B1 | 5/2018 | Fernandez et al. | |
| 2008/0226070 A1 | 9/2008 | Herz | |
| 2011/0113245 A1* | 5/2011 | Varadarajan | G06Q 20/385 713/168 |
| 2012/0212323 A1 | 8/2012 | Skaaksrud et al. | |
| 2013/0117801 A1 | 5/2013 | Shieh et al. | |
| 2013/0254858 A1* | 9/2013 | Giardina | G06F 21/42 726/7 |
| 2013/0326614 A1 | 12/2013 | Truskovsky et al. | |
| 2014/0201517 A1 | 7/2014 | Corrion | |
| 2014/0380425 A1 | 12/2014 | Lockett et al. | |
| 2015/0007279 A1 | 1/2015 | Hattori | |
| 2016/0036808 A1* | 2/2016 | Li | H04L 9/12 726/6 |
| 2017/0126404 A1 | 5/2017 | Unagami et al. | |
| 2017/0127276 A1* | 5/2017 | Koo | H04W 12/068 |
| 2017/0266562 A1 | 9/2017 | Hong | |
| 2017/0279733 A1 | 9/2017 | Marshall et al. | |
| 2019/0058989 A1* | 2/2019 | Park | H04W 88/06 |

OTHER PUBLICATIONS

"Device Registration And Linking", Roku SDK Documentation, Developer Guide, https://sdkdocs.roku.com/display/sdkdoc/Device+Registration+And+Linking, retrieved from the internet on Dec. 22, 2016, 3 pages.

* cited by examiner

SECURE BOOTSTRAPPING OF CLIENT DEVICE WITH TRUSTED SERVER PROVIDED BY UNTRUSTED CLOUD SERVICE

CROSS-REFERENCE TO RELATED APPLICATIONS

This application is a continuation of U.S. application Ser. No. 15/389,534, filed Dec. 23, 2016, the entirety of which is hereby incorporated by reference herein.

TECHNICAL FIELD

The present disclosure relates to onboarding client devices into a trusted system using a cloud discovery service.

BACKGROUND

The collaboration industry is transitioning away from premise deployed infrastructure, signaling, and media control toward cloud-hosted offerings. However, providers of cloud-hosted offerings encounter new challenges in satisfying customers' privacy and security concerns. The provider should work to ensure that devices (e.g., Internet Protocol (IP) telephones) registering against a cloud based discovery service can do so securely and simply. In particular, sending private data, such as security data, to a public, cloud based discovery service during initial registration may present an opportunity to attack the foundation of subsequent connections. In other words, all of the registration, configuration, and bootstrap data should remain under full control of the customer.

One solution that cloud providers have presented uses an external Key Management System (KMS) under the customer's control. Each customer's KMS retains control of media encryption keys, and the cloud provider does not have access to the encryption keys. Existing KMS systems rely on an initial bootstrap process that assumes the client devices has established trust anchors and knows the identity and address of its KMS. Typically, during the device registration/discovery process, the client device fully trusts the cloud provider, shares all credential and configuration information with the cloud provider, and does not need to discover the cloud provider. For example, many software products require entry of a license key in order to activate the product. However, this activation model does not require discovery of a cloud provider in order to activate the software. In this case, entry of a Microsoft® license key will result in the software product contacting a well-known Microsoft service in order to validate the activation code/license key. This model fully trusts the cloud provider (e.g., Microsoft).

DESCRIPTION OF EXAMPLE EMBODIMENTS

Overview

Figure 1:
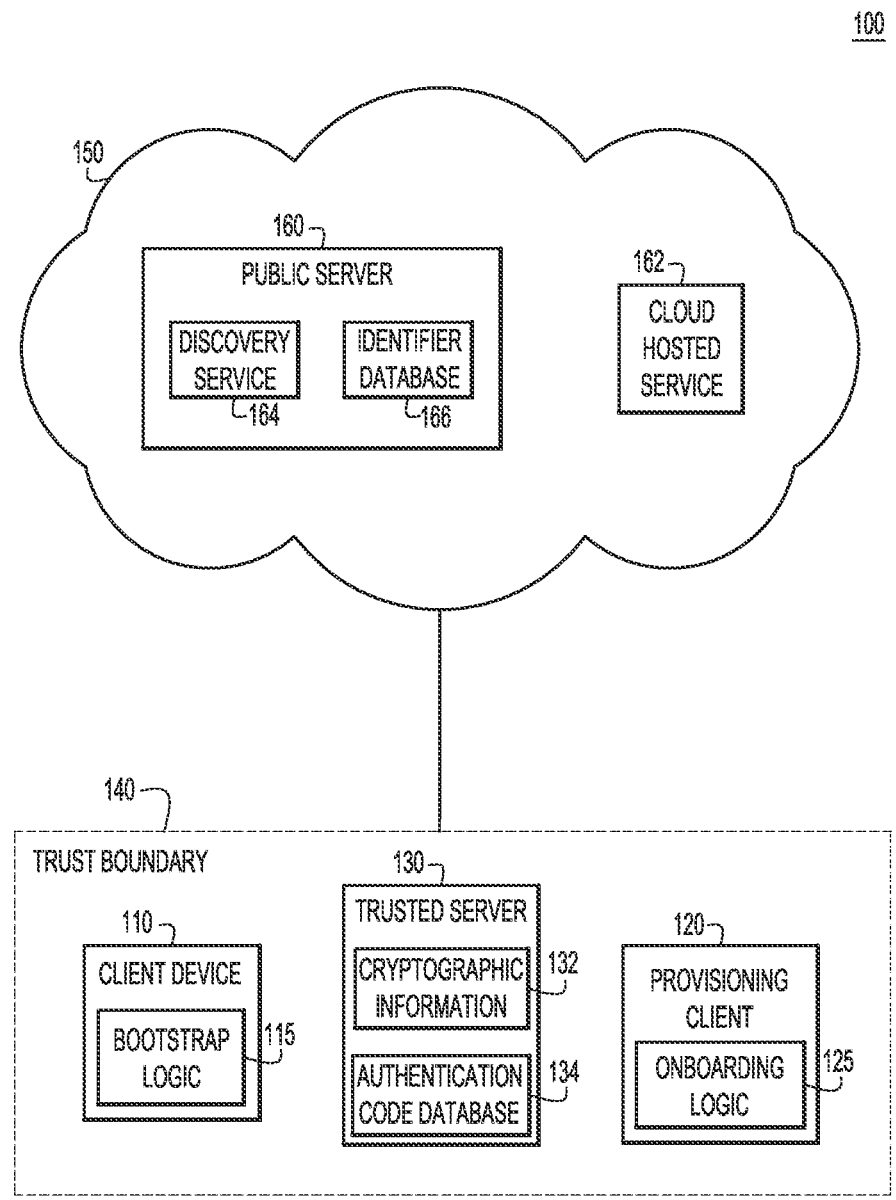
FIG. 1 is a simplified block diagram of a bootstrapping system to securely bootstrap a client device into a trusted service through the use of an untrusted discovery service, according to an example embodiment.

Presented herein are techniques for bootstrapping a client device against a trusted server. The client device obtains an activation code comprising an identifier and a one time password. The client device sends a message to a public server requesting an address of a trusted server associated with the identifier. The client device receives the address of the trusted server from the public server and initiates a communication session with the trusted server at the address provided by the public server. The one time password is used as a shared secret to secure the communication session. The client device downloads cryptographic information from the trusted server.

Detailed Description

In order to establish a trusted cloud collaboration system, customers should be given control over the cryptographic keys used to establish secure end-to-end communications amongst the customer's end users. Customer control over cryptographic material may include how a client device discovers an appropriate trusted server (e.g., an identity provider), how a client device receives authorization tokens, how a client device determines its trusted certificate authorities, or how a client device determines which cloud collaboration provider it should connect to.

To establish trusted communications paths between devices and a cloud collaboration system, customers should be given control of the Public Key Infrastructure (PKI) trust anchors used to secure the communications between the device and the customer's trusted services. Customers should be given guarantees that device discovery of PKI trust anchors is under their control. Additionally, customers should be given guarantees that authorization tokens for trusted service access (e.g., KMS access) remain under their control and are not exposed to the cloud collaboration system. The techniques presented herein enable this level of customer control.

Two additional challenges arise when bootstrapping a device against a cloud hosted collaboration system, as well as against on-premise equipment. First, some devices (e.g., low end IP phones) may have limited display and/or data entry capabilities. Many IP phones do not have cameras, do not have displays capable of rendering web pages, and have limited keyboards options (e.g., for entering special characters typically found in user passwords, or entering long email addresses or domain names). These devices cannot be used for logging in using standard browser-based Single Sign-On (SSO) authentication. End users who log in to applications using browser based SSO cannot use the same mechanism for logging on with IP phones.

Additionally, devices typically have firmware baked in at manufacturing time when they leave the factory. With current manufacturing and supply chain pipeline lead times, by the time a device is first powered up and bootstrapped, the firmware in the device may easily be a year old. Any PKI trust anchors baked into the device firmware could potentially be compromised by the time the device is bootstrapped.

Referring now to FIG. 1, a bootstrapping system 100 that securely bootstraps a client device without exposing sensitive information outside of the customer's trust boundary. A client device 110 uses bootstrapping logic 115 to bootstrap into a cloud hosted service (e.g., a cloud hosted collaboration system). A provisioning client 120 uses onboarding logic 125 to assist the client device 110 in bootstrapping into the cloud hosted service. A trusted server 130 includes cryptographic information 132 and an authentication code database 134. In one example, the trusted server 130 is an Identity Provider (IdP), and the cryptographic information 132 comprises an OAuth token and trusted Certificate Authority PKI information. The client device 110, the provisioning client 120, and the trusted server 130 are all within the same trust boundary 140. In other words, those are the elements of the system 100 that are under a customer's control.

The client device 110, provisioning client 120, and the trusted server 130 are configured to communicate over a network 150 to a public server 160. The network 150 also connects to a cloud hosted service 162 (e.g., a cloud hosted collaboration service) that provides a service to any client devices that are properly authorized. The public server 160 includes a discovery service 164 that is configured to direct client devices to the appropriate servers in order for the client devices to obtain authorization for the cloud hosted service. The public server also includes an identifier database 166 that stores short term, randomly generated identifiers that are associated with trusted servers.

In one example, the cloud hosted service 162 provides text, voice, video, document sharing, administration, configuration, and/or provisioning services to authorized customers. There is a trust relationship between the cloud hosted service 162 and the trusted server 130 to determine which client devices are authorized by the trusted server 130 to access the cloud hosted service 162. Access to the cloud hosted service 162 is granted to client device 110 by presenting a valid credential (e.g., an OAuth token) that was issued by trusted server 130. There may be multiple instances of the cloud hosted service 162 deployed, e.g., in different geographical regions and/or in different service provider data centers. The client device 110 discovers to which instance of the cloud hosted service 162 it should connect.

In another example, the discovery service 164 is a well known, global discovery service that the client device 110 leverages to discover which trusted server 130 to bootstrap against. The public server 160 that runs the discovery service 164 may also run one of the instances of the cloud hosted service 162. In other words, the United States based instance of the cloud hosted service 162 may be collocated with the global discovery service 164. The discovery service 164 is the first point of contact for a bootstrapping device. The fully qualified domain name (FQDN) of the public server 160 running the discovery service 164 may be hard coded into the firmware of the client device 110, along with a PKI trust anchor used for establishing a Transport Layer Security (TLS) connection to the discovery service 164. As the FQDN of the discovery service 164 and the PKI trust anchor is baked into the device firmware by the manufacturer, the customer does not have direct control over these.

The discovery service 164 may either redirect the client device 110 to the trusted server 130 or proxy the bootstrap request from the client device 110 to the trusted server 130. If the discovery service 164 proxies the bootstrap request through to the trusted server 130, then the bootstrap messages are being transported through the provider controlled network 150. If the discovery service 164 redirects the client device 110 to the trusted server 130, then the discovery service 164 specifies the network address (e.g., FQDN) of the trusted server 130, and also specifies the PKI trust anchor used for establishing a TLS connection to the trusted server 130. In this case, the bootstrap requests are still being transported over transport resources that are specified by the provider and not by the customer. While the client device 110 leverages the discovery service 164, the client device 110 does not blindly trust the information received from the discovery service 164, does not blindly trust that it is connecting to the correct trusted server 130, and has no guarantee that the bootstrap messages are protected from eavesdropping and/or Man-in-the-Middle compromise.

The trusted server 130 is customer controlled and trusted. The client device 110 mutually authenticates against the trusted server 130 and establishes a secure, encrypted channel with the trusted server 130. The client device 110 may not trust the transport link to the trusted server 130 that was specified by the discovery service 164, since the discovery service 164 is not in the trust boundary 140. The client device 110 and the trusted server 130 establish a shared secret, and use this shared secret and a suitable Password Authenticated Key Exchange (PAKE) handshake to establish an ephemeral, secure, encrypted channel. Suitable PAKE handshakes may include, but are not limited to, Discrete Log Diffie-Hellman Secure Remote Password (SRP), Elliptic Curve Diffie-Hellman SRP, and/or Juggling-PAKE. Two different user experience (UX) models for establishing the shared secret are described herein, and will be described in further detail in the description of FIGS. 2A and 2B, as well as FIGS. 4A and 4B.

Once the client device 110 has mutually authenticated itself with the trusted server 130 and established an ephemeral, secure, encrypted channel with the trusted server 130, the client device 110 downloads bootstrap configuration information and has guarantees that the information will not be exposed to the potentially compromised transport layer. The client device 110 downloads a set of customer-specified PKI trust anchors from the customer-controlled trusted server 130, and uses these trust anchors for establishing any subsequent TLS connections. Additionally, the client device downloads any necessary credentials (e.g., OAuth tokens) for accessing services, such as the cloud hosted service 162.

In this fashion, the customer is given assurances that after the bootstrap of the client device 110 completes, even though the (untrusted) discovery service 164 played an integral role in the device bootstrap flow, (i) the PKI trust anchors that the client device 110 needs for connecting to the cloud hosted service 162 or any other services under customer control (e.g., an IdP or KMS) remain under fill customer control, and (ii) any critical credentials (e.g., an authorization token for accessing the KMS) remain under full customer control.

In a further example, the provisioning client 120 may represent a logged in session (e.g., browser based, native application, etc.) with the trusted server 130. The provisioning client 120 is used to facilitate two different UX models for establishing the shared secret between the client device 110 and the trusted server 130.

Figure 2A:
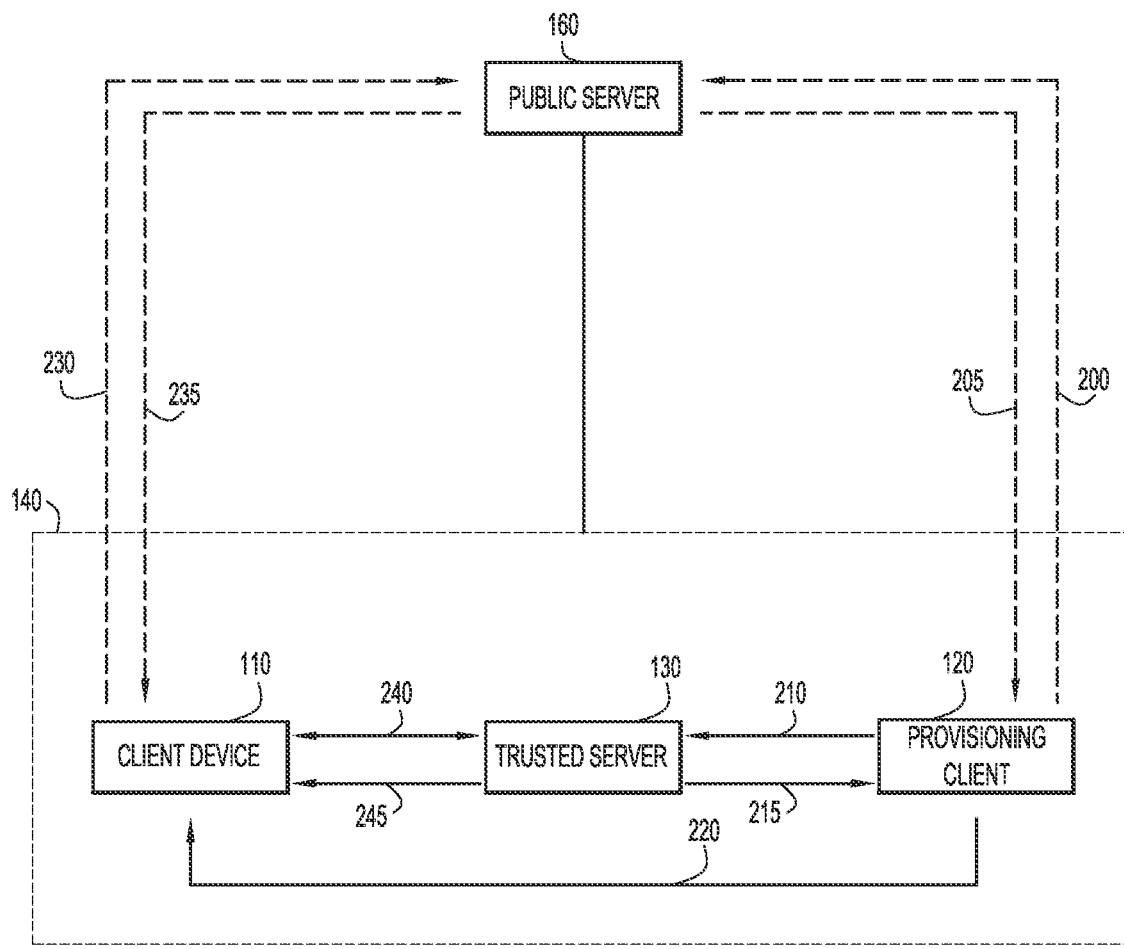
FIG. 2A is a simplified block diagram of messages passed between elements of the bootstrapping system using a first user experience, according to an example embodiment.

Referring now to FIG. 2A, a simplified bock diagram shows the bootstrap flow for the client device 110 according to a first UX model, also called the activation UX model. The activation UX model may be used to bootstrap a client device 110 that has an input capability (e.g., a numeric keypad or keyboard). The provisioning client 120 sends a request 200 for an identifier to the public server 160 that is running the discovery service 164. The request includes the identity of the trusted server 130, which the provisioning client 120 knows from a previously logged in session. The public server 160 responds to the provisioning client 120 with a message 205 that includes the identifier. The provisioning client 120 then sends a request 210 to the trusted server 130 for a One Time Password (OTP) to associate with the identifier. The trusted server 130 generates the OTP and responds to the provisioning client 120 with a message 215 that includes the OTP.

Once the provisioning client 120 has received both the identifier and the OTP, it combines the two into an activation code that is transferred to the client device 110 via an out-of-band mechanism. In one example, the out-of-band mechanism may be displaying the activation code to a user who can enter it in to the client device 110. Alternatively, the provisioning client 120 may provide the activation code to a user in a different form (e.g., email, readable printout, two-dimensional barcode, etc.) that is deemed to be secure by the customer.

Upon initially powering up, the client device 110 receives the activation code (e.g., from the user) and sends a request 230 to the public server 160 at an address that was encoded by the manufacturer of the client device 110. The request 230 includes the identifier portion of the activation code, but does not include the OTP. The public server 160 uses the identifier to determine the address of the trusted server 130 associated with the identifier, and responds to the client device 110 with a message 235 that includes the address of the trusted server 130. The client device 110 initiates an ephemerally secure channel 240 with the trusted server 130, and uses the OTP portion of the activation code as the shared secret to secure the channel 240. In one example, the ephemerally secure channel 240 is generated and secured through a suitable PAKE handshake. The client device 110 may also send the identifier portion and use the entire activation code to secure the channel 240. The client device 110 can complete the bootstrap process by downloading cryptographic information 245 from the trusted server 130 across the secure channel 240.

Figure 2B:
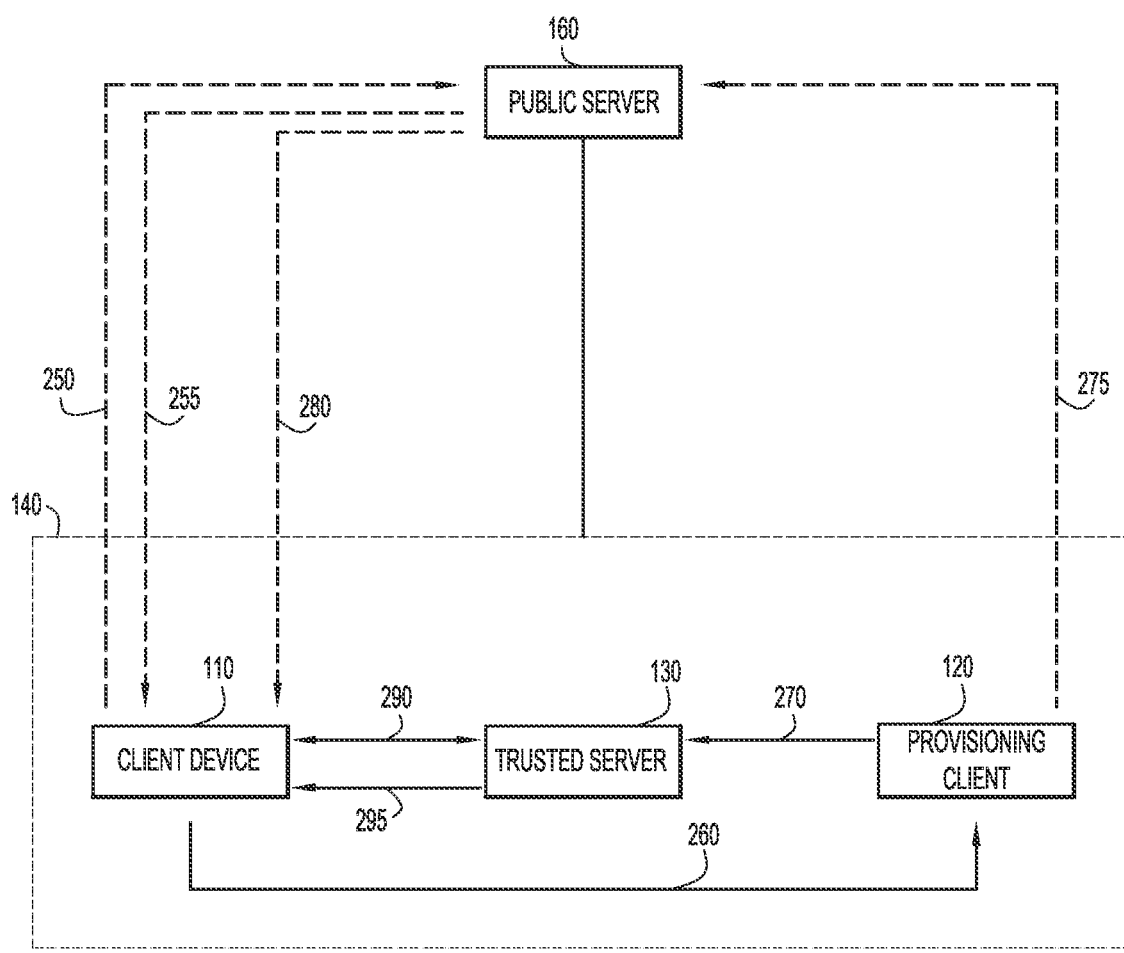
FIG. 2B is a simplified block diagram of messages passed between elements of the bootstrapping system using a second user experience, according to an example embodiment.

Referring now to FIG. 2B, a simplified bock diagram shows the bootstrap flow for the client device 110 according to a second UX model, also called the acquisition UX model. The acquisition UX model may be used to bootstrap a client device 110 that does not have an input capability, but has a display capability. When the client device 110 initially powers up, it sends a request 250 to the public server 160 at the network address (e.g., FQDN) baked into the firmware by the manufacturer of the client device 110. The public server 160 generates a random identifier and responds to the client device 110 with a message 255 that includes the identifier. Since the public server 160 does not yet have a trusted server 130 to associate with the identifier, it does not yet direct the client device 110 toward any particular trusted server 130.

The client device 110 generates a OTP and combines the OTP with the identifier to generate an activation code, which is transferred to the provisioning client via an out-of-band mechanism 260. In one example, the activation code is displayed on the client device 110 so that a user can read it and enter the activation code into the provisioning client 120.

Once the activation code has been entered, the provisioning client 120 sends a message 270 to the trusted server 130 that includes at least the OTP portion of the activation code, but may also include the entire activation code. The provisioning client 120 also sends a message 275 to the public server that includes the identifier portion of the activation code and the identity (e.g., the network address) of the trusted server 130. The public server 160 associates the network address of the trusted server 130 with the identifier and sends a message 280 directing the client device 110 to bootstrap against the trusted server 130 at that network address.

After the client device 110 receives the network address of the trusted server 130 from the public server 160, the client device 110 initiates an ephemerally secure channel 290 with the trusted server 130, and uses the OTP portion of the activation code as the shared secret to secure the channel 290. The client device 110 may also send the identifier portion and use the entire activation code to secure the channel 290. The client device 110 can complete the bootstrap process by downloading cryptographic information 295 from the trusted server 130 across the secure channel 290.

In one example, the ephemerally secure channel 290 may be secured through a PAKE handshake in which the client device 110 initially sends the trusted server 130 the identifier. The trusted server 130 responds with a PAKE challenge to the client device 110. The client device 110 forms a PAKE challenge response based on the OTP associated with the identifier and sends the PAKE response to the trusted server 130. In other words, the client device 110 generates a mathematical construct derived from the PAKE challenge and the OTP associated with the identifier. The server 130 verifies the PAKE response (e.g., calculates the same mathematical construct) and completes the handshake.

In FIGS. 2A and 2B, messages that leave the trust boundary 140 are shown as dotted lines, and may be compromised or susceptible to Man-in-the-Middle attacks. In contrast, messages that are always under customer control are shown as solid lines. The identifier was generated and transported outside of the trust boundary 140 (e.g., in messages 205 and 230). However, the OTP portion of the activation code was only transported in channels that are securely under customer control (e.g., the securely logged in provisional client or the out-of-band mechanism). This allows the client device 110 to discover and bootstrap against the appropriate trusted server 130 without exposing the OTP outside of the trust boundary 140.

In one example, the messages between the public server 160 and the client device 110 and/or provisioning client may be unencrypted, since the transport layer is not necessarily trusted. Alternatively, the messages may be encrypted (e.g., in a TLS connection) to provide an additional layer of security, even though the PKI trust anchors for this security may or may not be valid.

In another example, the provisioning client 120 may include lease information (e.g., a signature) in the communications with the trusted server 130 to prevent other client devices from hijacking the identifier at the trusted server 130. In other words, the identifier may expire at the trusted server 130 allowing the client device 110 a limited amount of time to contact the trusted server 130 and download current cryptographic information.

Figure 3:
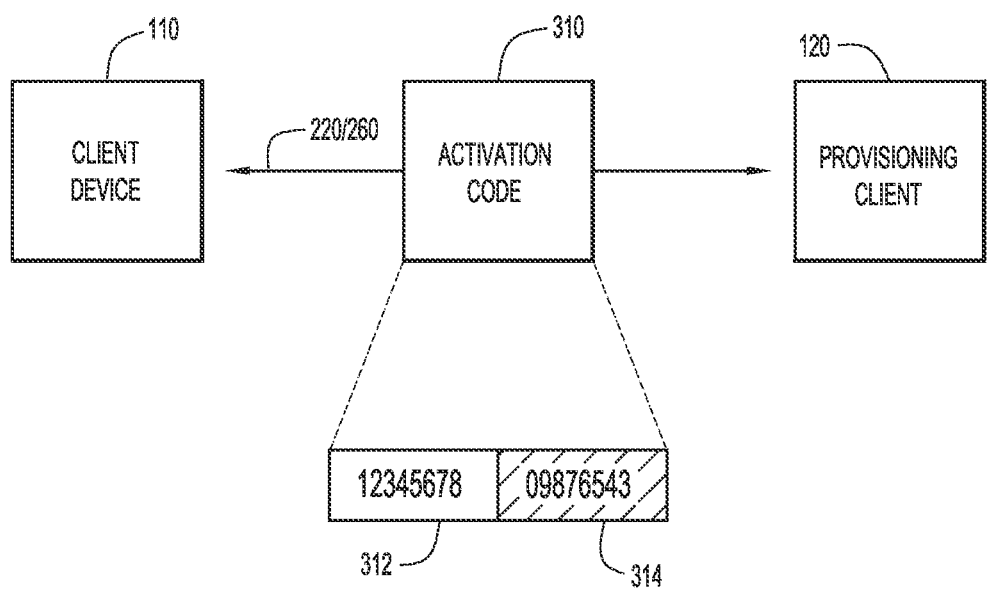
FIG. 3 illustrates passing an activation code between a client device and a provisioning client, according to an example embodiment.

Referring now to FIG. 3, an example of the activation code 310 is shown. The activation code 310 is passed in the out-of-band mechanisms 220 or 260, for the first UX model and the second UX model, respectively. The activation code 310 includes an identifier 312 and an OTP 314. The identifier 312 is a temporary, randomly generated number that the discovery service uses to associate the network address of the trusted server 130 to a particular bootstrap event. The identifier 312 is generated and transported both inside and outside of the customer's control, and may be intercepted and known outside of the customer's trust boundary. In one example, the identifier 312 is generated by and known to the discovery service 164. The identifier 312 is used by the discovery service 164 to direct the bootstrapping client device 110 to the correct trusted server 130.

In another example, the OTP 314 is known by the customer's trusted server 130 and used to complete a PAKE handshake between the client device 110 and the trusted server 130. The OTP 314 is generated under the customer's control and is only transported across channels that have been secured under the customer's control. The OTP 314 is never shared outside of the customer's trust boundary (e.g., to the discovery service 164 or the cloud hosted service 162). For the first UX model, the OTP 314 is generated by the trusted server 130 and entered into the client device 110. For the second UX model, the OTP 314 is generated by the client device 110 and entered into the trusted server 130 via the provisioning client 120.

In a further example, the identifier 312 and 314 are eight digit alphanumeric characters. This allows the entire activation code 310 to be a sixteen digit alphanumeric code that is relatively easy to input into the client device 110 (e.g., under the first UX model) or display on the client device 110 (e.g., under the second UX model). The exact length and composition of the identifier 312 and OTP 314 may change, but are typically kept short and simple enough that a user can easily enter the entire activation code 310. For instance, the identifier 312 and/or OTP 314 may include Unicode Transformation Format (UTF) encoded characters (e.g., UTF-8, UTF-16, or UTF-32), American Standard Code for Information Interchange (ASCII) characters, Extended Binary Coded Decimal Interchange Code (EBCDIC) characters, ISO 8859 encoded characters, or other special characters.

Both UX models provide a simple and intuitive flow for bootstrapping a client device 110. There is no need for the end user to configure or provision anything on the client device 110. For instance, there is no need to enter a domain, choose a service type, enter email addresses or long credentials containing special characters. Use of a PAKE handshake allows a relatively weak password (i.e., the activation code 310) to be used to secure the bootstrap process.

Figure 4A:
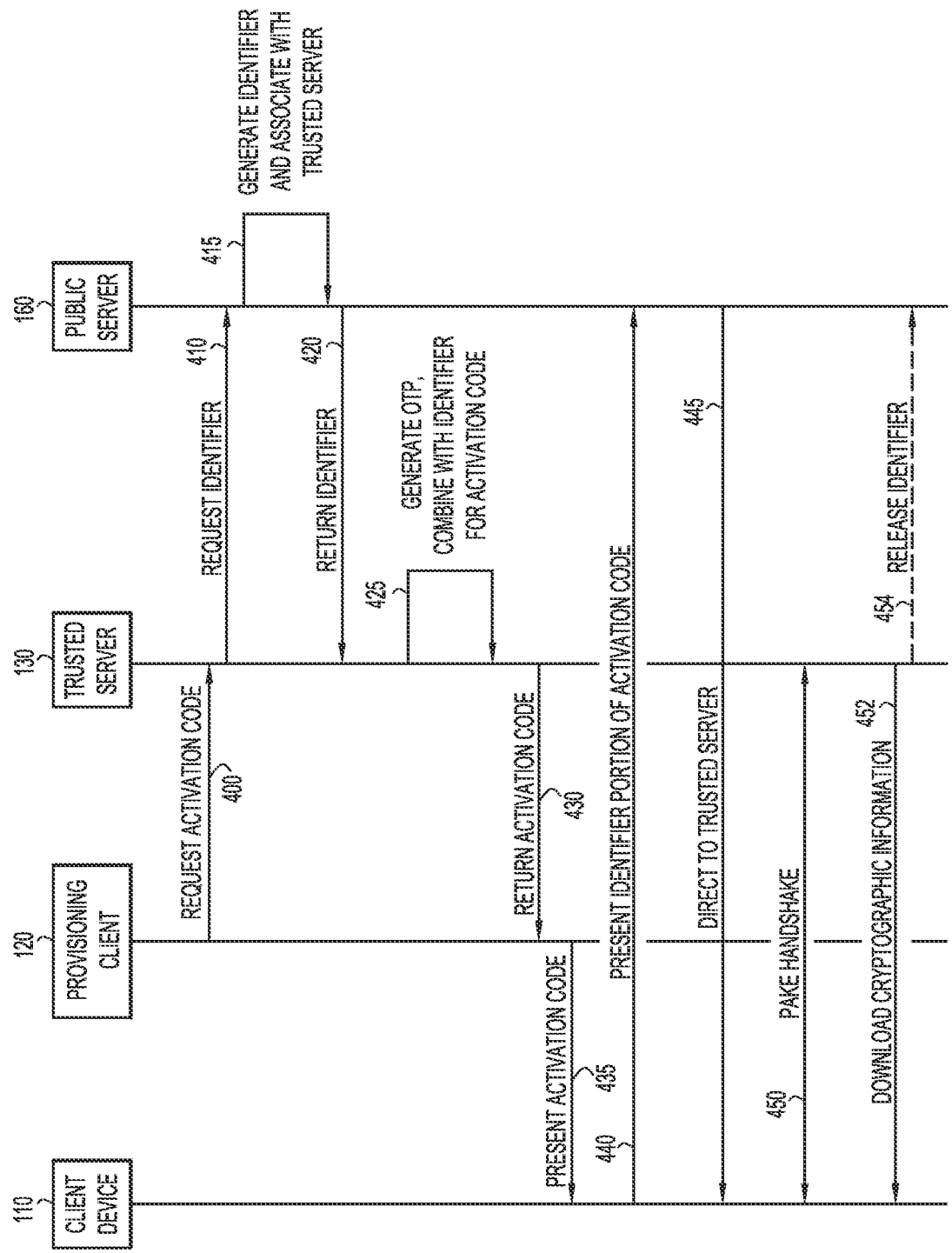
FIG. 4A is a ladder diagram illustrating a sequence of messages exchanged in bootstrapping a client device using a first user experience, according to an example embodiment.

Referring now to FIG. 4A, a ladder diagram illustrates a sequence of messages passed between elements in the bootstrapping of a client device 110 according to an example of the first UX model. When a client device 110 is ready to be put into service, a provisioning client 120 sends a request 400 for an activation code to a trusted server 130 that will provide the cryptographic material to bootstrap the client device 110. In response, the trusted server sends a request 410 for an identifier to a public server 160 running a discovery service. The public server 160 generates a random number as the identifier and associates the identifier with the trusted server 130 in step 415. The public server 160 returns the identifier to the trusted server 130 in a message 420.

The trusted server 130 generates an OTP and, in step 425, combines the OTP with the identifier from message 420. In one example, the identifier and OTP are combined by concatenation, but other combinations may also be used as long as each element of the system is able to determine the identifier and the OTP separately from the combined activation code. The trusted server 130 then sends the activation code to the provisioning client 120 in message 430. The provisioning client 120 presents the activation code to the client device 110 as message 435 via an out-of-band mechanism. In one example, the provisioning client 120 displays the activation code to a user. The user inputs the activation code displayed on the provisioning client 120 into the client device 110 after powering up the client device 110.

Once the client device 110 has obtained the activation code, it sends the identifier portion of the activation code to the public server 160 at an address that was coded into the firmware of the client device 110 by the manufacturer. The public server 160 determines the trusted server 130 that was previously (i.e., in step 415) associated with the identifier, and directs the client device 110 to the trusted server 130. In one example, the public server 160 sends the network address (e.g., FQDN) of the trusted server 130 to the client device 110. Alternatively, the public server 160 may proxy the connection from the client device 110 to the trusted server 130.

The client device 110 initiates a PAKE handshake 450 with the trusted server 130. The PAKE handshake is secured with the shared secret of the OTP that was generated at the trusted server 130 and has never left the control of devices under the customer's control (e.g., trusted server 130, provisioning client 120, and client device 110). Additionally, the OTP has never been sent over any transport layer that is not under the customer's control. Further, with the PAKE handshake 450, the OTP is never sent in its raw format (i.e., only a mathematical construct based on the OTP is sent) by the client device 110. After securing the communication channel between the client device 110 and the trusted server 130, the client device 110 downloads cryptographic information from the trusted server 130 in message 452. In one example the cryptographic information includes trust anchors specified by the customer, as well as credentials enabling the client device 110 to enroll in cloud hosted services.

Additionally, the trusted server 130 may send a message 454 to the public server 160 releasing the association between the identifier and the trusted server 130. This allows the public server 160 to reuse the identifier at a later time, in order to bootstrap a different client device.

Figure 4B:
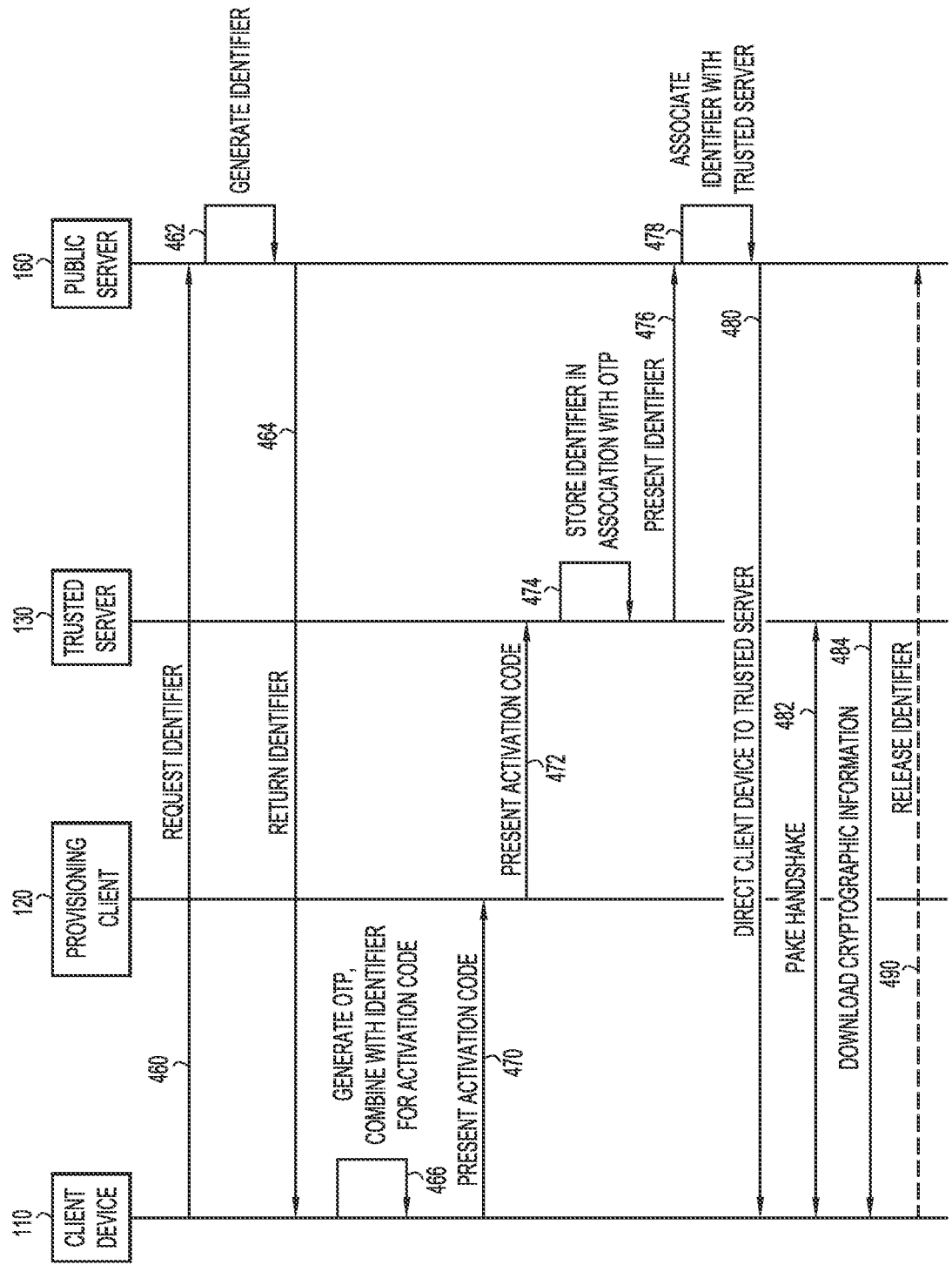
FIG. 4B is a ladder diagram illustrating a sequence of messages exchanged in bootstrapping a client device using a second user experience, according to an example embodiment.

Referring now to FIG. 4B, a ladder diagram illustrates a sequence of messages passed between elements in the bootstrapping of a client device 110 according to an example of the second UX model. When a client device 110 initially powers up, it sends a request 460 for an identifier to the public server 160 running a discovery service. The network address of the public server 160 is well known, and was coded into the firmware of the client device 110 when it was manufactured. The public server 160 may determine whether the client device is a trusted device (e.g., it has a trusted Media Access Control (MAC) address) before proceeding. The public server 160 generates an identifier in step 462, but does not have a trusted server to associate with the identifier. The public server 160 returns the identifier to the client device 110 in a message 464. The client device 110 generates an OTP and, in step 466, combines the OTP with the identifier received in message 464 to generate an activation code.

The client device 110 presents the activation code to a provisioning client 120 via an out-of-band mechanism 470. In one example, the client device 110 displays the activation code to a user. The user then inputs the activation code displayed by the client device 110 into the provisioning client 120. The provisioning client 120 sends the activation code to the trusted server 130 through a connection that is previously secured and trusted by the customer. The trusted server 130 stores the identifier in association with the OTP in step 474, and presents the identifier to the public server 160 in a message 476. In step 478, the public server 160 associates the identifier presented in message 476 with the trusted server 130 that sent the message 476.

Once the public server 160 has associated a trusted server 130 with the identifier, the public server 160 directs the client device 110 to the trusted server in message 480. In one example, the client device 110 polls the public server 160 periodically until the public server 160 has stored an association between a trusted server 130 and the identifier. Alternatively, storing the association at the public server 160 may trigger the message 480 to be sent to the client device 110.

The client device 110 then initiates a PAKE handshake 482 with the trusted server 130, securing the connection between the client device 110 and the trusted server 130 with the shared secret of the OTP. After securing the communication channel between the client device 110 and the trusted server 130, the client device 110 downloads cryptographic information from the trusted server 130 in message 484. In one example the cryptographic information includes trust anchors specified by the customer, as well as credentials enabling the client device 110 to enroll in cloud hosted services.

Additionally, the client device 110 may send a message 490 to the public server 160 releasing the association between the identifier and the trusted server 130. Alternatively, the identifier may automatically expire on the public server 160 after a short period of time, even if not explicitly released. This allows the public server 160 to reuse the identifier at a later time, in order to bootstrap a different client device.

Figure 5:
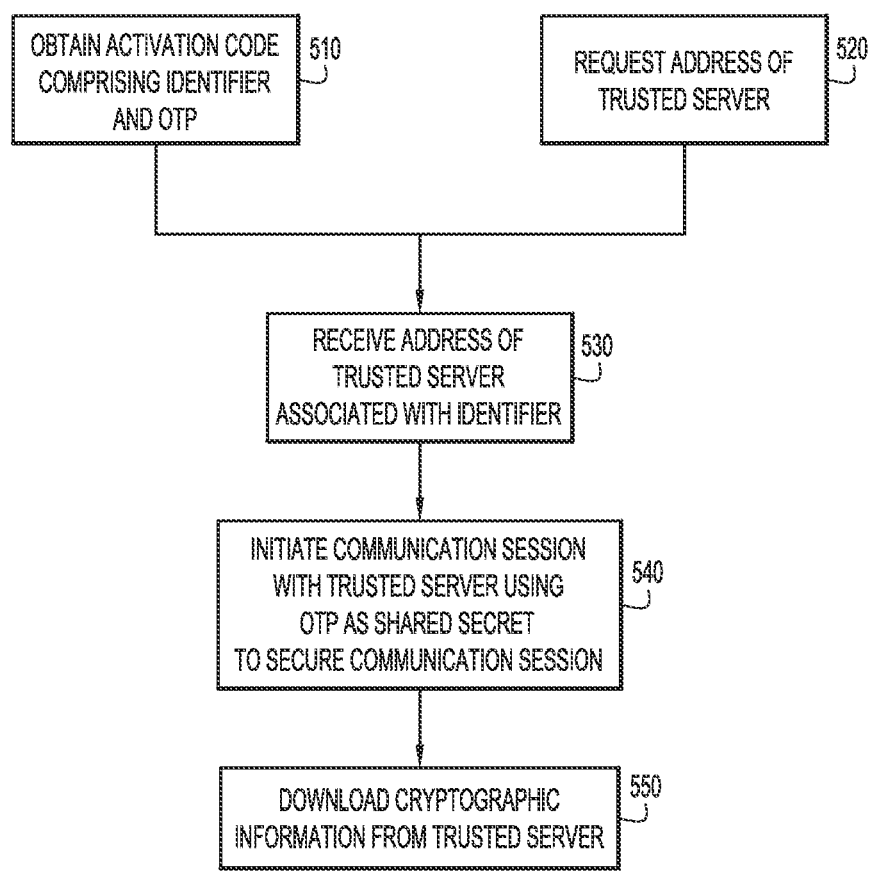
FIG. 5 is a flowchart of operations performed by a client device to bootstrap into a trusted server using a public server, according to an example embodiment.

Referring now to FIG. 5, a flowchart illustrates an example process 500 by which a client device (e.g., client device 110) bootstraps against a customer controlled server. In step 510, the client device obtains an activation code comprising an identifier portion and an OTP portion. In one example, each of the identifier portion and the OTP portion of the activation code comprises a randomly generated eight digit number that is relatively simple to input and/or display on a client device with limited capabilities. In step 520, the client device sends a request to a discovery service for the network address of a trusted server. In one example, the discovery service is instantiated on a public server with an address that is baked in to the firmware of the client device during manufacture.

In one example, the request for the address of the trusted server sent in step 520 includes the identifier from the activation code obtained in step 510. Alternatively, the request sent in step 520 may be sent before the client device obtains the activation code in step 510.

In step 530, the client device receives the network address of the trusted server from the discovery service on the public server. The public server sends the network address associated with the identifier from the activation code. In step 540, the client device initiates a communication session with the trusted server at the network address received in step 530. The communication session is secured using the OTP portion of the activation code as a shared secret. In one example, a PAKE exchange uses the activation code as the shared secret to generate an ephemeral, secure, encrypted communication session. The client device initiates the PAKE handshake by sending the identifier portion of the activation code, and responds to a PAKE challenge from the trusted server with a mathematical construct derived from the OTP portion of the activation code.

In step 540, the client device downloads cryptographic information from the trusted server over the communication session initiated in step 540. In one example, the cryptographic information includes a credential (e.g., an OAuth token) authorizing the client device to access a cloud hosted service. In another example, the cryptographic information includes a trust anchor that is under the customer's control, enabling the client device to use a transport layer (e.g., TLS connections) trusted by the customer.

Figure 6:
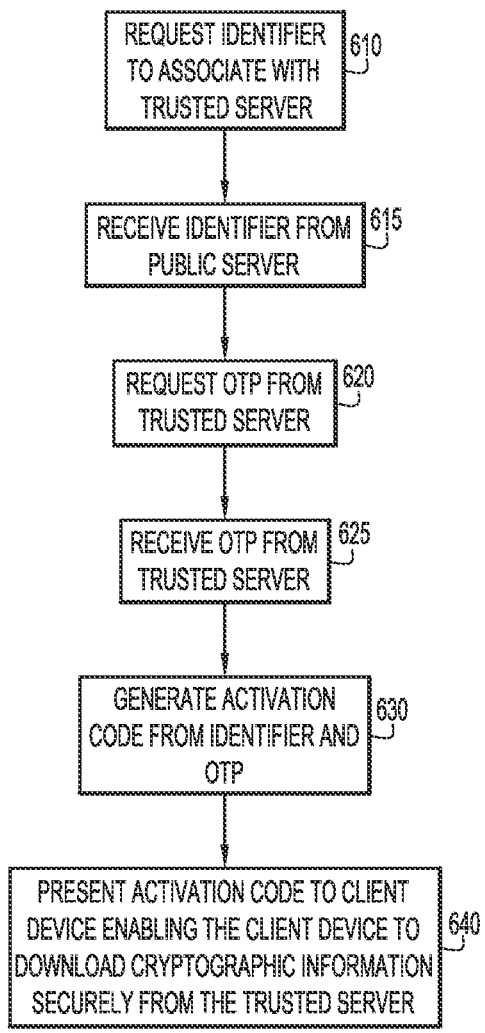
FIG. 6 is a flowchart of operations performed by a provisioning client to assist a client device in bootstrapping into a trusted server using a public server, according to an example embodiment.

Referring now to FIG. 6, a flowchart illustrates an example process by which a provisioning client (e.g., provisioning client 120) assists a client device in the bootstrap process. In step 610, the provisioning client sends a request to a discovery service for an identifier to associate with a trusted server. The discovery service is provided by a public server with a well known network address. In one example, the identity of the trusted server (e.g., the network address of the trusted server) is included in the request for an identifier. In step 615, the provisioning client receives the identifier from the public server running the discovery service.

In step 620, the provisioning client sends a request to the trusted server for an OTP that will be used to secure the initial bootstrap communication for a client device. In one example, the request to the trusted server includes the identifier received in step 615, which the trusted server stores in association with the OTP that it will generate. In step 625, the provisioning client receives the OTP from the trusted server.

In step 630, the provisioning client generates an activation code by combining the identifier received in step 615 and the OTP received in step 625. In one example, the activation code comprises a short (e.g., sixteen character) alphanumeric number that is simple to enter into a client device that may have limited data entry capabilities. In step 640, the provisioning client presents the activation code to the client device, enabling the client device to download cryptographic information from the trusted server in a secure communication session. In one example, the provisioning client displays the activation code to a user, who enters it into the client device when the client device first powers up.

Figure 7:
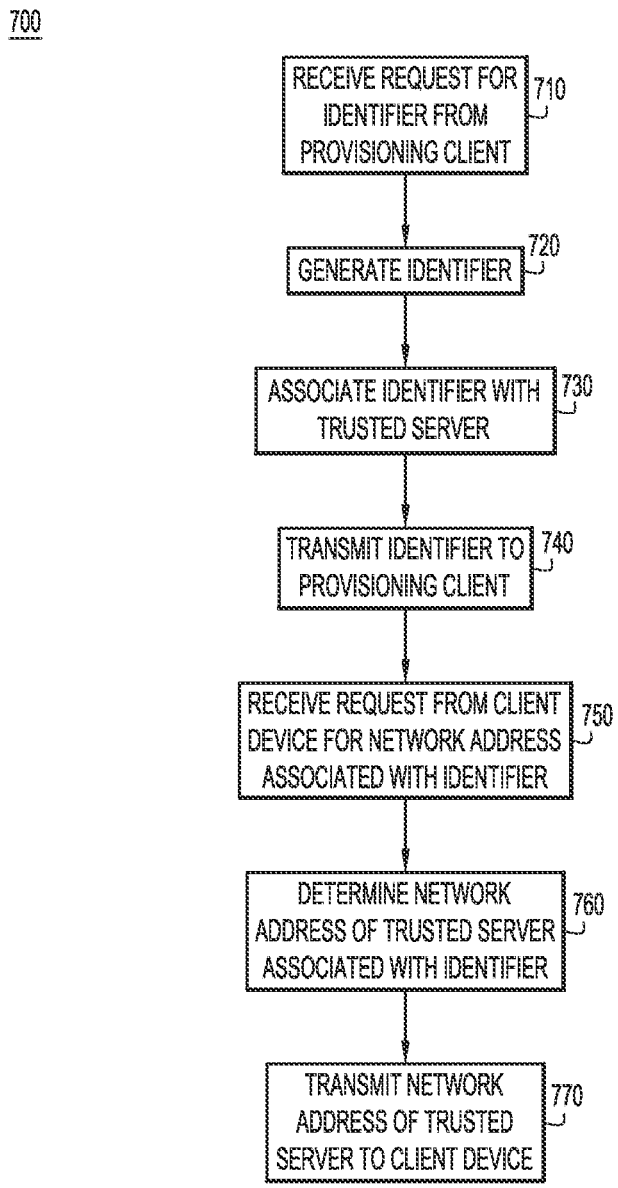
FIG. 7 is a flowchart of operations performed by a public server to assist a client device in bootstrapping into a trusted server, according to an example embodiment.

Referring now to FIG. 7, a flowchart illustrates an example process 700 by which a public server (e.g., public server 160) running a discovery service assists in bootstrapping a client device. In step 710, the public server receives a request for an identifier from a provisioning client. The request from the provisioning client includes the network address of a trusted server. In one example, the provisioning client may send the request to the public server via the trusted server. In step 720, the public server generates a random identifier, and associates the identifier with the trusted server in step 730. In step 740, the public server transmits the identifier to the provisioning client.

In step 750, the public server receives an initial bootstrap request from a client device. The request from the client devices includes the identifier and requests the network address of the trusted server associated with that identifier. The public server determines the network address of the trusted server associated with the identifier in step 760, and transmits the network address of the trusted server to the client device in step 770.

Figure 8:
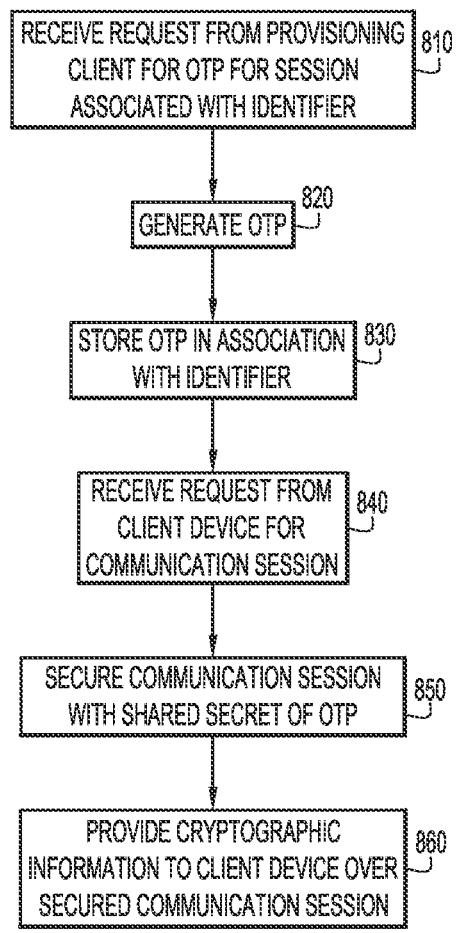
FIG. 8 is a flowchart of operations performed by a trusted server to bootstrap a client device using a public server, according to an example embodiment.

Referring now to FIG. 8, a flowchart illustrates an example process 800 by which a trusted server (e.g., trusted server 130) assists in bootstrapping a client device. In step 810, the trusted server receives a request from a provisioning client for an OTP to securely bootstrap a client device. The request includes an identifier that is associated with a particular bootstrap process for a particular client device. In step 820, the trusted server generates an OTP, and stores the OTP in association with the OTP in step 830.

In step 840, the trusted server receives a request from a client device for a communication session. The request for the communication session may initiate a PAKE handshake. In one example, the request may include the identifier and a mathematical construct derived from the OTP. In step 850, the trusted server secures the communication session with the shared secret of the OTP. In one example, the trusted server uses the identifier to determine the OTP associated with the identifier and generate a mathematical construct derived from the OTP. The mathematical construct derived from the OTP may be compared with the mathematical construct provided in the request of step 840 to determine the authenticity of the request. The mathematical construct may be any type of mathematical operation that cannot be easily reverse engineered, so that knowledge of the OTP ensures knowledge of the mathematical construct, but knowledge of the mathematical construct does not enable knowledge of the OTP.

In step 860, the trusted server provides cryptographic information to the client device over the secured communication channel. In one example, the cryptographic information includes a credential (e.g., an OAuth token) authorizing the client device to access a cloud hosted service. In another example, the cryptographic information includes a trust anchor that is under the customer's control, enabling the client device to use a transport layer (e.g., TLS connections) trusted by the customer.

Figure 9:
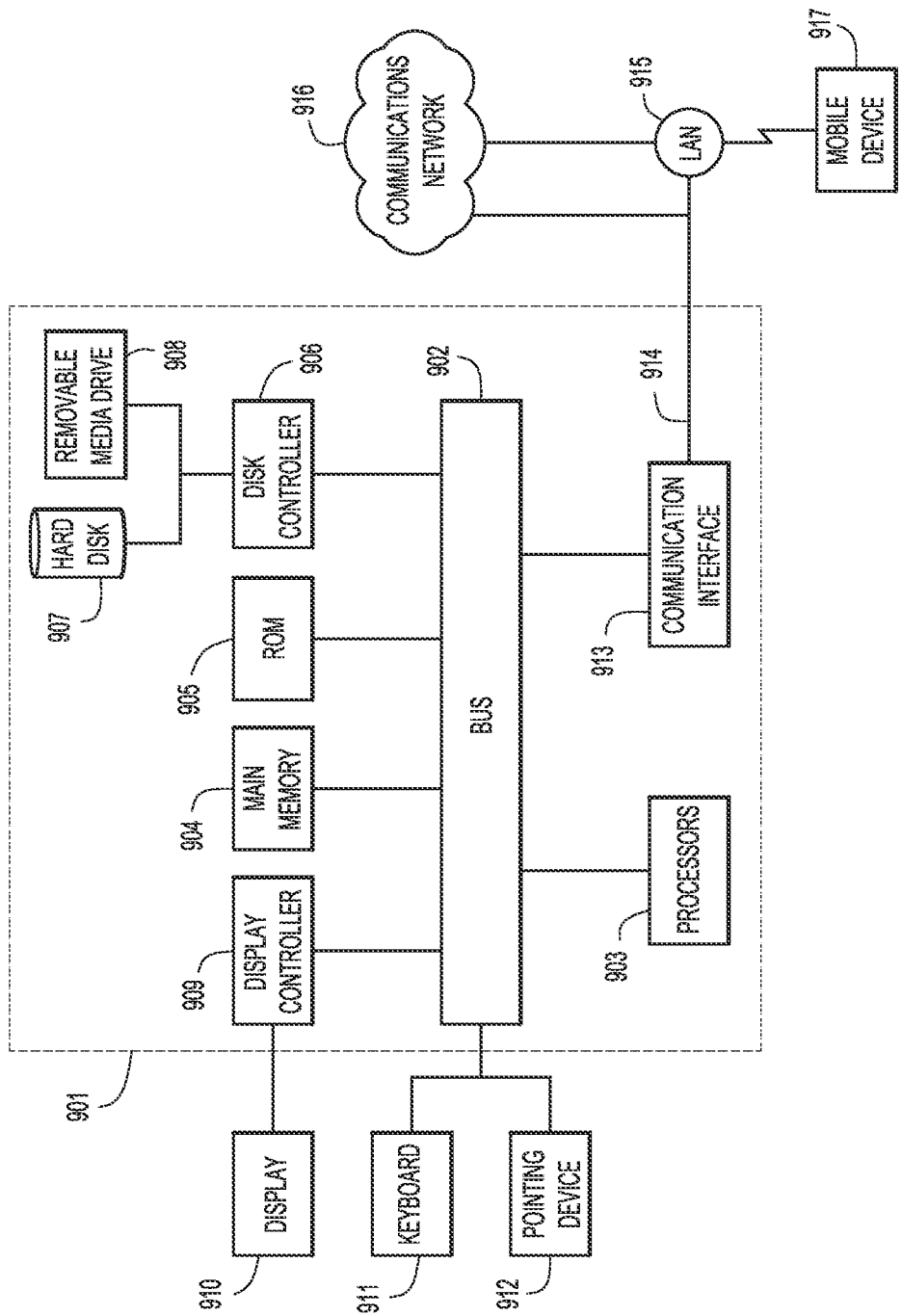
FIG. 9 is a simplified block diagram of a device that that may be configured to perform methods presented herein, according to an example embodiment.

Referring now to FIG. 9, an example of a computer system 901 (e.g., client device 110, trusted server 130, public server 160, etc.) upon which the embodiments presented may be implemented is shown. The computer system 901 may be programmed to implement a computer based device, as used in a secure bootstrapping system. The computer system 901 includes a bus 902 or other communication mechanism for communicating information, and a processor 903 coupled with the bus 902 for processing the information. While the figure shows a single block 903 for a processor, it should be understood that the processors 903 may represent a plurality of processing cores, each of which can perform separate processing. The computer system 901 also includes a main memory 904, such as a random access memory (RAM) or other dynamic storage device (e.g., dynamic RAM (DRAM), static RAM (SRAM), and synchronous DRAM (SD RAM)), coupled to the bus 902 for storing information and instructions to be executed by processor 903. In addition, the main memory 904 may be used for storing temporary variables or other intermediate information during the execution of instructions by the processor 903.

The computer system 901 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive, solid state drive, etc.). The storage devices may be added to the computer system 901 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 901 may also include a display controller 909 coupled to the bus 902 to control a display 910, such as a cathode ray tube (CRT), liquid crystal display (LCD) or light emitting diode (LED) display, for displaying information to a computer user. The computer system 901 may also include input devices, such as a keyboard 911 and a pointing device 912, for interacting with a computer user and providing information to the processor 903. The pointing device 912, for example, may be a mouse, a trackball, track pad, touch screen, or a pointing stick for communicating direction information and command selections to the processor 903 and for controlling cursor movement on the display 910. In addition, a printer may provide printed listings of data stored and/or generated by the computer system 901.

The computer system 901 performs a portion or all of the processing steps of the operations presented herein in response to the processor 903 executing one or more sequences of one or more instructions contained in a memory, such as the main memory 904. Such instructions may be read into the main memory 904 from another computer readable storage medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 901, for driving a device or devices for implementing the operations presented herein, and for enabling the computer system 901 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a wired or wireless network interface card to attach to any packet switched (wired or wireless) LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local area network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.). The signals through the various networks and the signals on the network link 914 and through the communication interface 913, which carry the digital data to and from the computer system 901 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA), tablet computer, laptop computer, or cellular telephone.

In summary, the techniques described herein allow a customer's devices to leverage a cloud hosted, provider-controlled service to facilitate discovery of their customer controlled trusted server (e.g., IdP server). The customer's devices bootstrap against the customer's trusted server, while protecting the bootstrap flow from potential compromise over the provider-controlled cloud services. The techniques presented herein enable the customer to have full control over the device bootstrap configuration, and ensure that any PKI trust anchors and sensitive credentials (e.g., authorization tokens) remain within their trust boundary control. This provides advantages to customer controlled KMS techniques, in particular in how a client device discovers its IdP, authenticates against its IdP and receives an authorization token, and/or establishes it PKI trust anchors.

Prior art pairing flows assume that the client device places full trust in the cloud service provider. The transport layer is assumed to be trusted, and all data (e.g., configuration information, authorization credentials, etc.) is freely shared with the cloud service provider. The prior art does not address the security concerns of customers who want to leverage a cloud hosted service, but want to retain control over their own sensitive credentials (e.g., authorization tokens), and guarantee that the transport to their sensitive services (e.g., customer controlled IdP) has not been compromised. Similar issues arise with prior art activation code flow in that the software client fully trusts the cloud service provider and shares all bootstrap information with the cloud service provider.

Some prior art bootstrap flows rely on an initial leap of faith whereby the device blindly trusts the entry point into the network and then discovers its PKI root configuration without any form of verification. Alternatively, the bootstrap flow may rely on a very large (e.g., several hundred) list of baked-in PKI trust anchors in order to establish TLS connections. This approach has the limitation that trust anchors may be revoked, but still be trusted by the previously shipped device firmware. In contrast, the bootstrapping techniques presented herein securely onboard a customer device that may have been sitting on a shelf, which may no longer have trustworthy trust anchors built in to its firmware.

Prior art device bootstrap flows typically place full trust in the provider they are connecting to. There is no mechanism by which a customer can be assured that the cloud service provider has not tampered with their device bootstrap flow. The prior art bootstrap flows also tend to be complex, and configuring a device to enable it to boot against a cloud service provider is a laborious task. In contrast, the bootstrap flows described herein allow for a simple and intuitive user experience, while simultaneously providing strong security and confidentiality to customers.

In one form, a computer implemented method provides for a client device to bootstrap against a trusted server. The method comprises the client device obtaining an activation code. The activation code comprises an identifier and a one time password. The client device sends a message to a public server. The message comprises a request for an address of a trusted server associated with the identifier. The client device receives the address of the trusted server from the public server and initiates a communication session with the trusted server at the address provided by the public server. The one time password is used as a shared secret to secure the communication session. The client device downloads cryptographic information from the trusted server.

In another form, an apparatus comprising a network interface unit and a processor is provided for bootstrapping the apparatus against a trusted server. The network interface unit is configured to enable network communications. The processor is coupled to the network interface unit and configured to obtain an activation code comprising an identifier and a one time password. The processor is also configured to send a message via the network interface unit to a public server. The message comprises a request for an address of the trusted server associated with the identifier. The processor is further configured to receive the address of the trusted server from the public server via the network interface unit. The processor is configured to cause the network interface unit to initiate a communication session with the trusted server at the address of the trusted server provided by the public server. The one time password is used as a shared secret to secure the communication session. The processor is then configured to cause the network interface unit to download trusted cryptographic information from the trusted server.

In still another form, a system comprising a trusted server, a provisioning client, and a client device are provided for bootstrapping the client device against the trusted server. The trusted server is configured to store cryptographic information. The provisioning client is configured to communicate with a public server to associate an identifier with the trusted server. The client device is configured to obtain an activation code comprising the identifier and a one time password. The client device is also configured to send a message to the public server. The message comprises a request for an address of the trusted server. The client device is further configured to receive the address of the trusted server from the public server and initiate a communication session with the trusted server at the address of the trusted server provided by the public server. The one time password is used as a shared secret to secure the communication session. The client device in configured to download the cryptographic information from the trusted server.

In yet another form, one or more non-transitory computer readable storage media is provided that is encoded with instructions that, when executed by a processor, cause the processor to obtain an activation code. The activation code comprises an identifier and a one time password. The instructions cause the processor to send a message to a public server. The message comprises a request for an address of a trusted server associated with the identifier. The instructions cause the process to receive the address of the trusted server from the public server and initiate a communication session with the trusted server at the address provided by the public server. The one time password is used as a shared secret to secure the communication session. The instructions cause the processor to download cryptographic information from the trusted server.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims.

What is claimed is:

1. A method comprising:
   at a trusted server, receiving a request for an activation code for a client device, the activation code comprising an identifier associated with the trusted server and a one-time password;
   obtaining the identifier from a public server that associates the identifier with the trusted server;
   generating the one-time password;
   combining the one-time password with the identifier to create the activation code;
   providing the activation code to a provisioning client that presents the activation code to the client device;
   securing a communication session with the client device using the one-time password as a shared secret; and
   providing trusted cryptographic information to the client device.

2. The method of claim 1, further comprising notifying the public server to release the identifier from being associated with the trusted server.

3. The method of claim 1, wherein obtaining the identifier comprises:
   sending a request for the identifier to the public server; and
   receiving the identifier from the public server, wherein the identifier is a random number generated by the public server in response to the request for the identifier.

4. The method of claim 1, wherein the communication session is secured according to a Password Authenticated Key Exchange (PAKE) protocol using the one-time password as the shared secret in the PAKE protocol.

5. The method of claim 4, wherein the PAKE protocol securing the communication session between the trusted server and the client device is proxied via the public server.

6. The method of claim 1, wherein the client device and the trusted server are within a first trust boundary and the public server is outside of the first trust boundary.

7. The method of claim 6, wherein the trusted cryptographic information includes trust anchors for the first trust boundary.

8. An apparatus comprising:
   a network interface unit that enables network communications; and
   a processor, coupled to the network interface unit, and configured to:
   at a trusted server, receive via the network interface unit a request for an activation code for a client device, the activation code comprising an identifier associated with the trusted server and a one-time password;
   obtain the identifier from a public server that associates the identifier with the trusted server;
   generate the one-time password;
   combine the one-time password with the identifier to create the activation code;
   provide the activation code to a provisioning client that presents the activation code to the client device;
   secure a communication session with the client device using the one-time password as a shared secret; and
   cause the network interface unit to provide trusted cryptographic information to the client device.

9. The apparatus of claim 8, wherein the processor is further configured to cause the network interface unit to notify the public server to release the identifier from being associated with the trusted server.

10. The apparatus of claim 8, wherein the processor is configured to obtain the identifier by:

causing the network interface unit to send a request for the identifier to the public server; and receive the identifier from the public server via the network interface unit, wherein the identifier is a random number generated by the public server in response to the request for the identifier.

11. The apparatus of claim 8, wherein the processor is configured to secure the communication session according to a Password Authenticated Key Exchange (PAKE) protocol using the one-time password as the shared secret in the PAKE protocol.

12. The apparatus of claim 11, wherein the PAKE protocol securing the communication session between the trusted server and the client device is proxied via the public server.

13. The apparatus of claim 8, wherein the client device and the trusted server are within a first trust boundary and the public server is outside of the first trust boundary.

14. The apparatus of claim 13, wherein the processor is configured to include trust anchors for the first trust boundary in the trusted cryptographic information.

15. A system comprising:
a client device;
a provisioning client configured to:
  send a request for an activation code for the client device, the activation code comprising an identifier and a one-time password; and
  present the activation code to the client device; and
a trusted server configured to:
  receive the request for the activation code for the client device;
  obtain the identifier from a public server that associates the identifier with the trusted server;
  generate the one-time password;
  provide the activation code to the provisioning client;
  secure a communication session with the client device using the one-time password as a shared secret; and
  provide trusted cryptographic information to the client device.

16. The system of claim 15, wherein the trusted server is further configured to notify the public server to release the identifier from being associated with the trusted server.

17. The system of claim 15, wherein the client device and the trusted server are configured to secure the communication session according to a Password Authenticated Key Exchange (PAKE) protocol using the one-time password as the shared secret in the PAKE protocol.

18. The system of claim 17, wherein the PAKE protocol securing the communication session between the trusted server and the client device is proxied via the public server.

19. The system of claim 15, wherein the client device and the trusted server are within a first trust boundary and the public server is outside of the first trust boundary.

20. The system of claim 19, wherein the trusted server is configured to include trust anchors for the first trust boundary in the trusted cryptographic information.

* * * * *